US011751169B2

(12) United States Patent
Sverdlov et al.

(10) Patent No.: US 11,751,169 B2
(45) Date of Patent: Sep. 5, 2023

(54) TECHNIQUES FOR OPTIMIZED FAST FOURIER TRANSFORM WINDOWS

(71) Applicant: QUALCOMM Incorporated, San Diego, CA (US)

(72) Inventors: Alexander Vladimir Sverdlov, Rehovot (IL); Michael Levitsky, Rehovot (IL); Gideon Shlomo Kutz, Ramat Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/152,478

(22) Filed: Jan. 19, 2021

(65) Prior Publication Data

US 2022/0232518 A1 Jul. 21, 2022

(51) Int. Cl.
*H04W 72/02* (2009.01)
*H04W 72/0446* (2023.01)
*H04W 72/1273* (2023.01)

(52) U.S. Cl.
CPC ....... *H04W 72/02* (2013.01); *H04W 72/0446* (2013.01); *H04W 72/1273* (2013.01)

(58) Field of Classification Search
CPC ............. H04W 72/02; H04W 72/0446; H04W 72/1273; H04L 27/2686; H04L 27/2665
See application file for complete search history.

(56) References Cited

U.S. PATENT DOCUMENTS

| 8,279,956 | B2 | 10/2012 | Hattori et al. |
| 10,284,410 | B1* | 5/2019 | Martinez ................. H04L 27/26 |
| 2016/0044666 | A1* | 2/2016 | Shin .................... H04W 56/002 |
| | | | 370/336 |
| 2016/0302246 | A1* | 10/2016 | Chervyakov ....... H04L 27/2665 |
| 2017/0086153 | A1 | 3/2017 | Yoon et al. |
| 2018/0352411 | A1* | 12/2018 | Ryu ....................... H04W 40/24 |
| 2019/0081841 | A1 | 3/2019 | Kim et al. |

OTHER PUBLICATIONS

International Search Report and Written Opinion—PCT/US2021/072984—ISA/EPO—dated Apr. 8, 2022.

* cited by examiner

*Primary Examiner* — Jae Y Lee
*Assistant Examiner* — Aixa A Guadalupe Cruz
(74) *Attorney, Agent, or Firm* — Dalei Dong; Harrity & Harrity, LLP

(57) ABSTRACT

Various aspects of the present disclosure generally relate to wireless communication. In some aspects, a first user equipment (UE) may receive, from a second UE and using a first fast Fourier transform (FFT) window configuration, a physical sidelink control channel (PSCCH) signal associated with a physical sidelink shared channel (PSSCH) signal. The UE may identify, based at least in part on the reception of the PSCCH signal, one or more values of one or more parameters estimated from the PSCCH signal. The UE may select, based at least in part on the one or more values of the one or more parameters, a second FFT window configuration to be used to receive the PSSCH signal. The UE may receive, from the second UE, the PSSCH signal using the second FFT window configuration, Numerous other aspects are described.

30 Claims, 12 Drawing Sheets

TECHNIQUES FOR OPTIMIZED FAST FOURIER TRANSFORM WINDOWS

FIELD OF THE DISCLOSURE

Aspects of the present disclosure generally relate to wireless communication and to techniques and apparatuses for optimized fast Fourier transform (FFT) windows.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (TDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the UE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, from a second UE and using a first fast Fourier transform (FFT) window configuration, a physical sidelink control channel (PSCCH) signal associated with a physical sidelink shared channel (PSSCH) signal; identifying, based at least in part on the reception of the PSCCH signal, one or more values of one or more parameters estimated from the PSCCH signal; selecting, based at least in part on the one or more values of the one or more parameters, a second FFT window configuration to be used to receive the PSSCH signal; and receiving, from the second UE, the PSSCH signal using the second FFT window configuration.

In some aspects, selecting the second FFT window configuration to be used to receive the PSSCH signal includes determining a timing of the second FFT window configuration based at least in part on the one or more values of the one or more parameters.

In some aspects, the method includes receiving a configuration indicating a set of FFT window configurations, where the set of FFT window configurations includes at least one of the first FFT window configuration or the second FFT window configuration.

In some aspects, selecting the second FFT window configuration to be used to receive the PSSCH signal includes selecting, based at least in part on the one or more values of the one or more parameters, the second FFT window configuration from the set of FFT window configurations.

In some aspects, the method includes receiving, from a third UE, a second PSCCH signal associated with a second PSSCH signal; identifying, based at least in part on the reception of the second PSCCH signal, one or more values of one or more parameters estimated from the second PSCCH signal; selecting, based at least in part on the one or more values of the one or more parameters, a third FFT window configuration to be used to receive the second PSSCH signal; and receiving, from the third UE, the second PSSCH signal using the third FFT window configuration.

In some aspects, receiving the second PSCCH signal includes: receiving, using the first FFT window configuration, the second PSCCH signal associated with the second PSSCH signal.

In some aspects, receiving the second PSSCH signal using the third FFT window configuration includes receiving the PSSCH signal, using the second FFT window configuration, and the second PSSCH signal, using the third FFT window configuration, during a same time domain period.

In some aspects, the first FFT window configuration is a default FFT window configuration.

In some aspects, the one or more parameters include at least one of: a timing offset parameter, a delay spread parameter, or a modulation and coding scheme parameter.

In some aspects, a first UE for wireless communication includes a memory and one or more processors coupled to the memory. The memory and the one or more processors may be configured to: receive, from a second UE, and using a first FFT window configuration, a PSCCH signal associated with a PSSCH signal; identify, based at least in part on the reception of the PSCCH signal, one or more values of one or more parameters estimated from the PSCCH signal; select, based at least in part on the one or more values of the one or more parameters, a second FFT window configuration to be used to receive the PSSCH signal; and receive, from the second UE, the PSSCH signal using the second FFT window configuration.

In some aspects, the one or more processors, when selecting the second FFT window configuration to be used to receive the PSSCH signal, are configured to determine a timing of the second FFT window configuration based at least in part on the one or more values of the one or more parameters.

In some aspects, the one or more processors are further configured to receive a configuration indicating a set of FFT window configurations, where the set of FFT window configurations includes at least one of the first FFT window configuration or the second FFT window configuration.

In some aspects, the one or more processors, when selecting the second FFT window configuration to be used to receive the PSSCH signal, are configured to select, based at least in part on the one or more values of the one or more parameters, the second FFT window configuration from the set of FFT window configurations.

In some aspects, the one or more processors are further configured to receive, from a third UE, a second PSCCH signal associated with a second PSSCH signal; identify, based at least in part on the reception of the second PSCCH signal, one or more values of one or more parameters estimated from the second PSCCH signal; select, based at least in part on the one or more values of the one or more parameters, a third FFT window configuration to be used to receive the second PSSCH signal; and receive, from the third UE, the second PSSCH signal using the third FFT window configuration.

In some aspects, the one or more processors, when receiving the second PSCCH signal, are configured to receive, using the first FFT window configuration, the second PSCCH signal associated with the second PSSCH signal.

In some aspects, the one or more processors, when receiving the second PSSCH signal using the third FFT window configuration, are configured to receive the PSSCH signal, using the second FFT window configuration, and the second PSSCH signal, using the third FFT window configuration, during a same time domain period.

In some aspects, the first FFT window configuration is a default FFT window configuration.

In some aspects, the one or more parameters include at least one of: a timing offset parameter, a delay spread parameter, or a modulation and coding scheme parameter.

In some aspects, a non-transitory computer-readable medium storing a set of instructions for wireless communication includes one or more instructions that, when executed by one or more processors of a first UE, cause the first UE to: receive, from a second UE and using a first FFT window configuration, a PSCCH signal associated with a PSSCH signal; identify, based at least in part on the reception of the PSCCH signal, one or more values of one or more parameters estimated from the PSCCH signal; select, based at least in part on the one or more values of the one or more parameters, a second FFT window configuration to be used to receive the PSSCH signal; and receive, from the second UE, the PSSCH signal using the second FFT window configuration.

In some aspects, the one or more instructions, that cause the first UE to select the second FFT window configuration to be used to receive the PSSCH signal, cause the first UE to determine a timing of the second FFT window configuration based at least in part on the one or more values of the one or more parameters.

In some aspects, the one or more instructions further cause the first UE to receive a configuration indicating a set of FFT window configurations, where the set of FFT window configurations includes at least one of the first FFT window configuration or the second FFT window configuration.

In some aspects, the one or more instructions, that cause the first UE to select the second FFT window configuration to be used to receive the PSSCH signal, cause the first UE to select, based at least in part on the one or more values of the one or more parameters, the second FFT window configuration from the set of FFT window configurations.

In some aspects, the one or more instructions further cause the first UE to receive, from a third UE, a second PSCCH signal associated with a second PSSCH signal; identify, based at least in part on the reception of the second PSCCH signal, one or more values of one or more parameters estimated from the second PSCCH select, based at least in part on the one or more values of the one or more parameters, a third FFT window configuration to be used to receive the second PSSCH signal; and receive, from the third UE, the second PSSCH signal using the third FFT window configuration.

In some aspects, the one or more instructions, that cause the first UE to receive the second PSCCH signal, cause the first UE to receive, using the first FFT window configuration, the second PSCCH signal associated with the second PSSCH signal.

In some aspects, the one or more instructions, that cause the first UE to receive the second PSSCH signal using the third FFT window configuration, cause the first UE to receive the PSSCH signal, using the second FFT window configuration, and the second PSSCH signal, using the third FFT window configuration, during a same time domain period.

In some aspects, the first FFT window configuration is a default FFT window configuration.

In some aspects, the one or more parameters include at least one of: a timing offset parameter, a delay spread parameter, or a modulation and coding scheme parameter.

In some aspects, an apparatus for wireless communication includes means for receiving, from a first UE and using a first FFT window configuration, a PSCCH signal associated with a PSSCH signal, means for identifying, based at least in part on the reception of the PSCCH signal, one or more values of one or more parameters estimated from the PSCCH signal; means for selecting, based at least in part on the one or more values of the one or more parameters, a second FFT window configuration to be used to receive the PSSCH signal; and means for receiving, from the first UE, the PSSCH signal using the second FFT window configuration.

In some aspects, the means for selecting the second FFT window configuration to be used to receive the PSSCH signal includes means for determining a timing of the second FFT window configuration based at least in part on the one or more values of the one or more parameters.

In some aspects, the apparatus includes means for receiving a configuration indicating a set of FFT window configurations, where the set of FFT window configurations includes at least one of the first FFT window configuration or the second FFT window configuration.

In some aspects, the means for selecting the second FFT window configuration to be used to receive the PSSCH signal includes means for selecting, based at least in part on the one or more values of the one or more parameters, the second FFT window configuration from the set of FFT window configurations.

In some aspects, the apparatus includes means for receiving, from a second UE, a second PSCCH signal associated with a second PSSCH signal; means for identifying, based at least in part on the reception of the second PSCCH signal, one or more values of one or more parameters estimated from the second PSCCH signal; means for selecting, based at least in part on the one or more values of the one or more parameters, a third FFT window configuration to be used to receive the second PSSCH signal; and means for receiving, from the second UE, the second PSSCH signal using the third FFT window configuration.

In some aspects, the means for receiving the second PSCCH signal includes means for receiving, using the first FFT window configuration, the second PSCCH signal associated with the second PSSCH signal.

In some aspects, the means for receiving the second PSSCH signal using the third FFT window configuration includes means for receiving the PSSCH signal, using the second FFT window configuration, and the second PSSCH signal, using the third FFT window configuration, during a same time domain period.

In some aspects, the first FFT window configuration is a default FFT window configuration.

In some aspects, the one or more parameters include at least one of: a timing offset parameter, a delay spread parameter, or a modulation and coding scheme parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages gill be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, bath their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATS, such as a 3G RAT, a 4G RAT, and/or a RAT subsequent to 5G (e.g., 6G).

Figure 1:
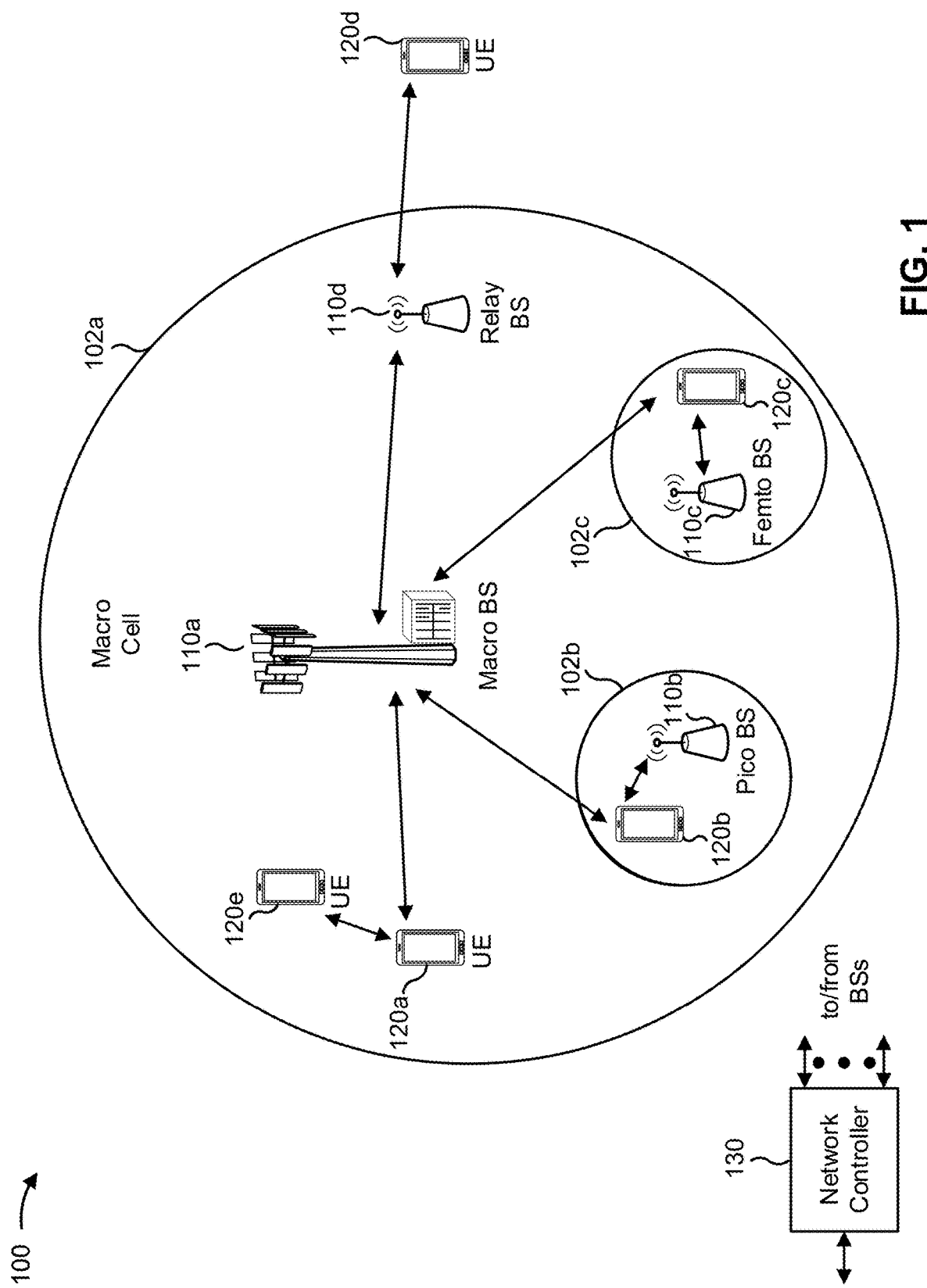
FIG. 1 is a diagram illustrating an example of a wireless network.

FIG. 1 is a diagram illustrating an example of a wireless network 100. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR. BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be al heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
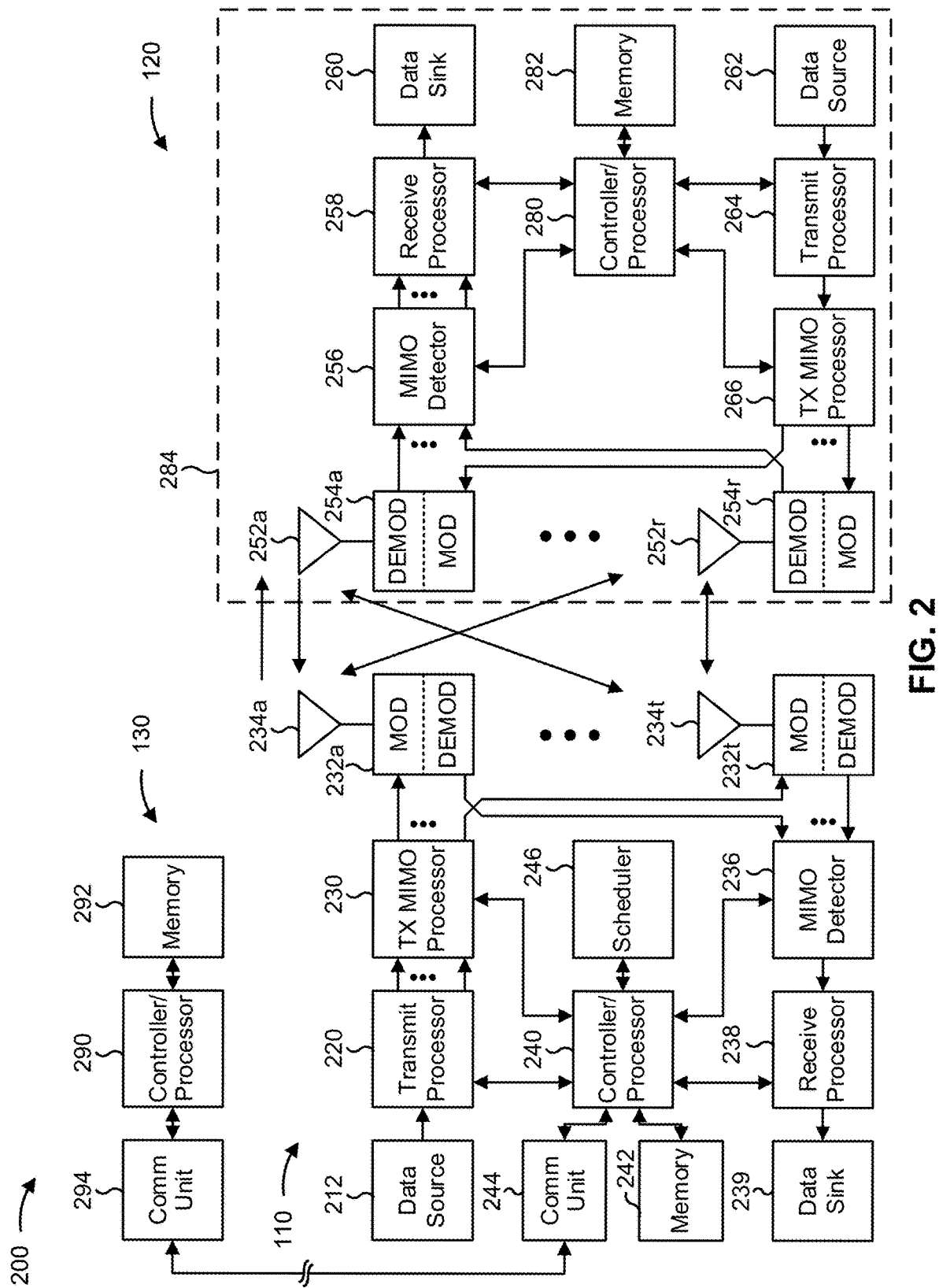
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system formation (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODS) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink at UE 120, a transmit processor 264 may receive and process data from a data source 262 and control information e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antennas) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEN OD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with optimized fast Fourier transform (ITT) windows, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10 and/or other processes as described herein. In some aspects, executing instructions may include running the instructions, converting the instructions, compiling the instructions, and/or interpreting the instructions.

In some aspects, the UE 120 includes means for receiving, from a second UE and using a first FFT window configuration, a physical sidelink control channel (PSCCH) signal associated with a physical sidelink shared channel (PSSCH) signal; means for identifying, based at least in part on the reception of the PSCCH signal, one or more values of one or more parameters estimated from the PSCCH signal; means for selecting, based at least in part on the one or more values of the one or more parameters, a second FFT window configuration to be used to receive the PSSCH signal; and/or means for receiving, from the second UE, the PSSCH signal using the second FFT window configuration. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for determining a timing of the second FFT window configuration based at least in part on the one or more values of the one or more parameters.

In some aspects, the UE 120 includes means for receiving a configuration indicating a set of FFT window configurations, where the set of FFT window configurations includes at least one of the first FFT window configuration or the second FFT window configuration.

In some aspects, the UE 120 includes means for selecting, based at least in part on the one or more values of the one or more parameters, the second FFT window configuration from the set of FFT window configurations.

In some aspects, the UE 120 includes means for receiving, from a third UE, second PSCCH signal associated with a second PSSCH signal; means for identifying, based at least in part on the reception of the second PSCCH signal, one or more values of one or more parameters estimated from the second PSCCH signal; means for selecting, based at least in part on the one or more values of the one or more parameters, a third FFT window configuration to be used to receive the second PSSCH signal; and/or means for receiving, from the third UE, the second PSSCH signal using the third FFT window configuration.

In some aspects, the UE 120 includes means for receiving, using the first FFT window configuration, the second PSCCH signal associated with the second PSSCH signal.

In some aspects, the UE 120 includes means for receiving the PSSCH using the second FFT window configuration, and the second PSSCH signal, using the third FFT window configuration, during a same time domain period.

As indicated above, FIG. 2 is provided as an example. Other examples may differ from what is described with regard to FIG. 2.

Figure 3:
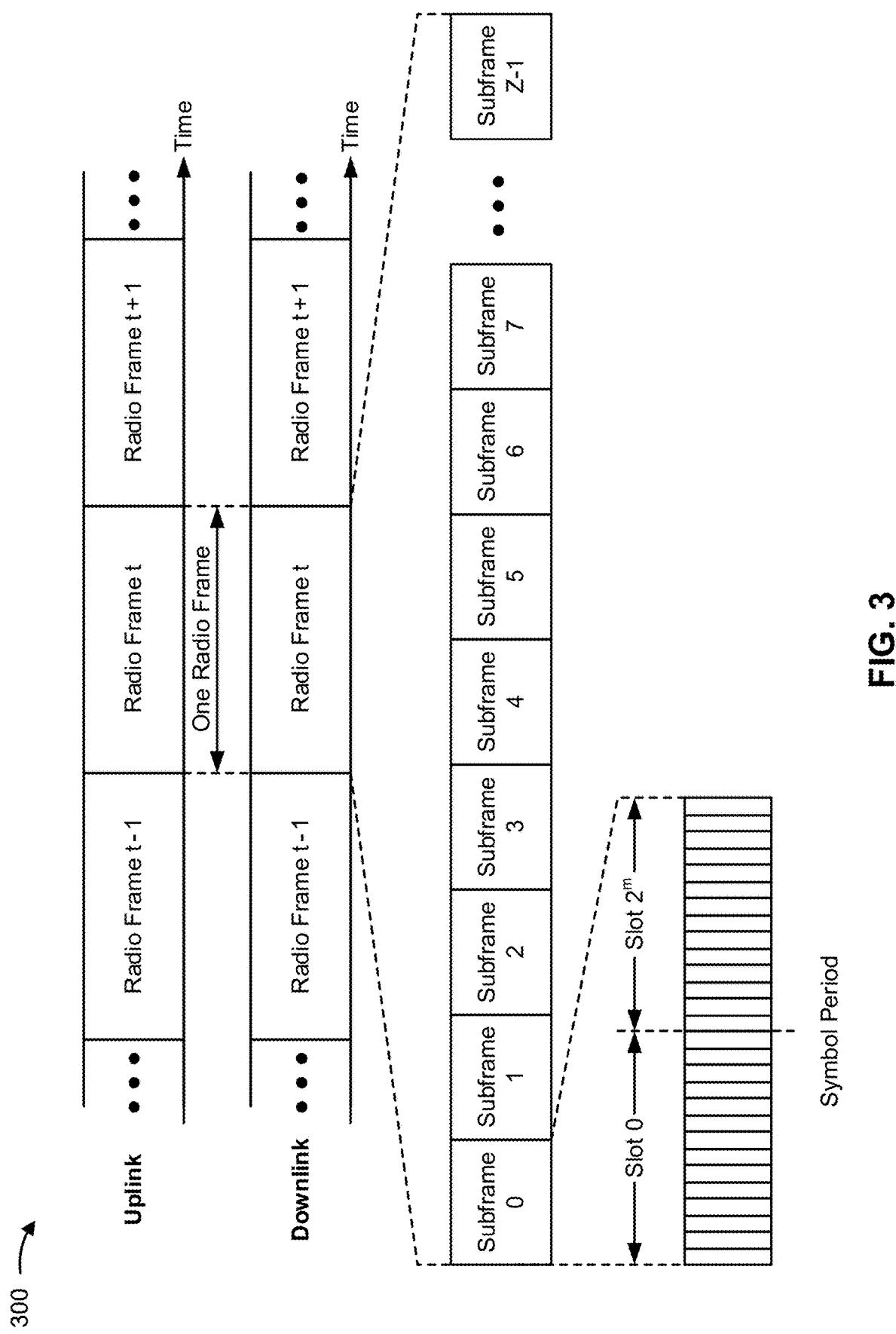
FIG. 3 is a diagram illustrating an example of a frame structure in a wireless communication network.

FIG. 3 is a diagram illustrating an example 300 of a frame structure in a wireless communication network. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, mini-slot based, and/or symbol-based, among other examples.

As indicated above, FIG. 3 is provided as an example. Other examples may differ from what is described with respect to FIG. 3.

Figure 4:
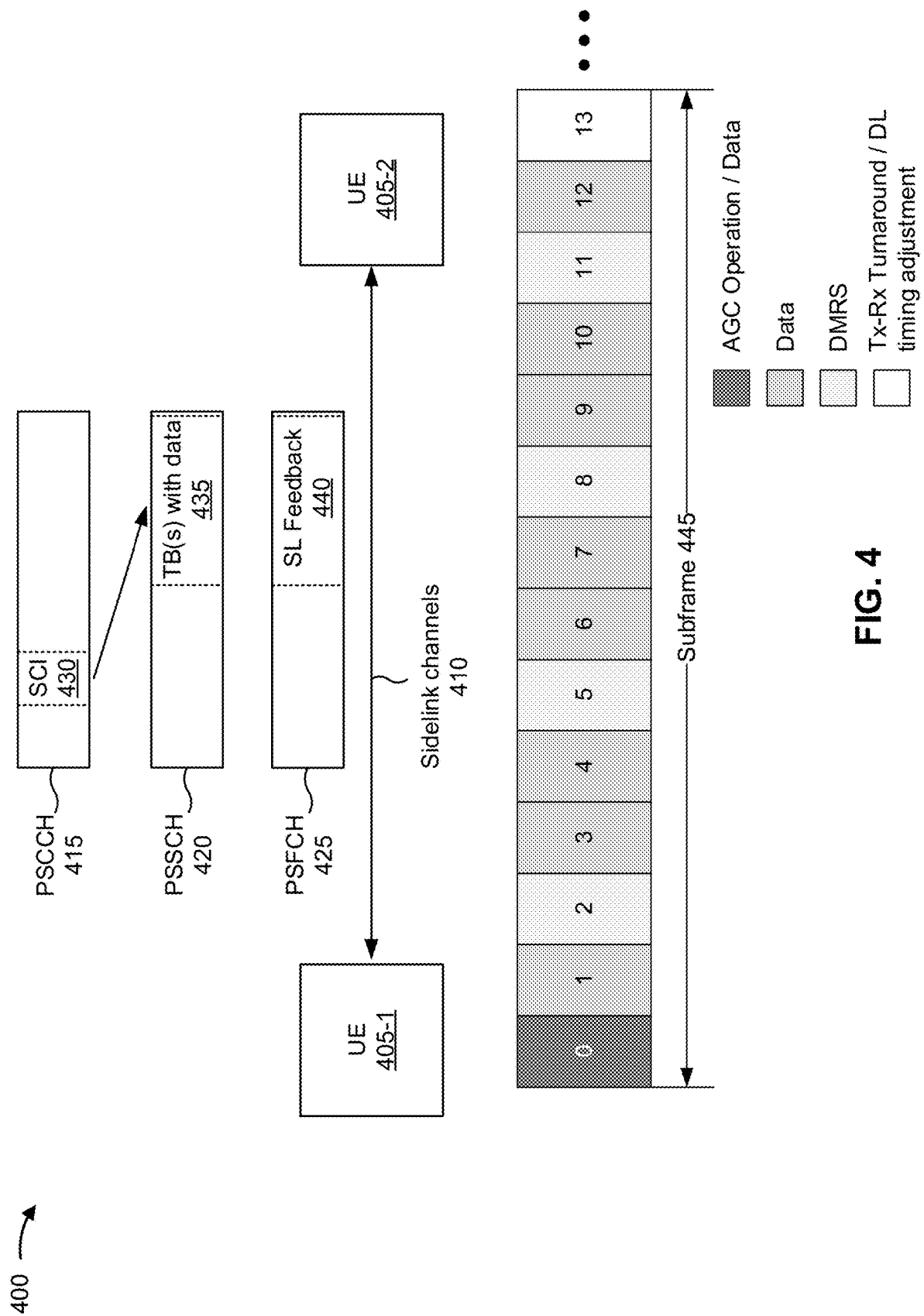
FIG. 4 is a diagram illustrating an example of sidelink communications.

FIG. 4 is a diagram illustrating an example 400 of sidelink communications. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, vehicle-to-pedestrian (V2P) communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PSCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, a modulation and coding scheme (MCS) to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In V2X communication systems, conditions of the sidelink channel 410 used to carry V2X communications can vary widely and change quickly due to the high mobility of vehicles and UES associated with the vehicles, large variations in vehicle traffic at different times of day and in different locations, a wide variety of topographies that the vehicles may traverse (e.g., dense urban environments, hilly environments, flat environments, and/or the like), and/or the like. Accordingly, in V2X communications between UEs 405, a signal received by a UE 405 may include significant power variability. For example, each subframe of the signal may be associated with significantly different power levels.

As shown in FIG. 4, a subframe 445 associated with a signal (e.g., an SC-FDMA signal) may include a plurality of symbols (e.g., symbols 0-13). In an SC-FDMA signal, nine symbols of the subframe 445 may be used for data (e.g., symbols 0, 1, 3, 4, 6, 7, 9, 10, and 12), four symbols of the subframe 445 may be used for demodulation reference signals (DMRSs) (e.g., symbols 2, 5, 8, and 11), and the last symbol (e.g., symbol 13) of the subframe 445 may be a silent symbol or a blanked symbol (e.g., a guard period (GP) or guard band) used for transitions between transmit and receive subframes. To compensate for the power variability of the signal, the UE 405 may perform an automatic gain control (AGC) operation on the signal in the first symbol (e.g., symbol 0) of each subframe in order to adjust the power of the signal to a suitable amplitude.

As indicated above, FIG. 4 is provided as an example. Other examples may differ from what is described with respect to FIG. 4.

Figure 5:
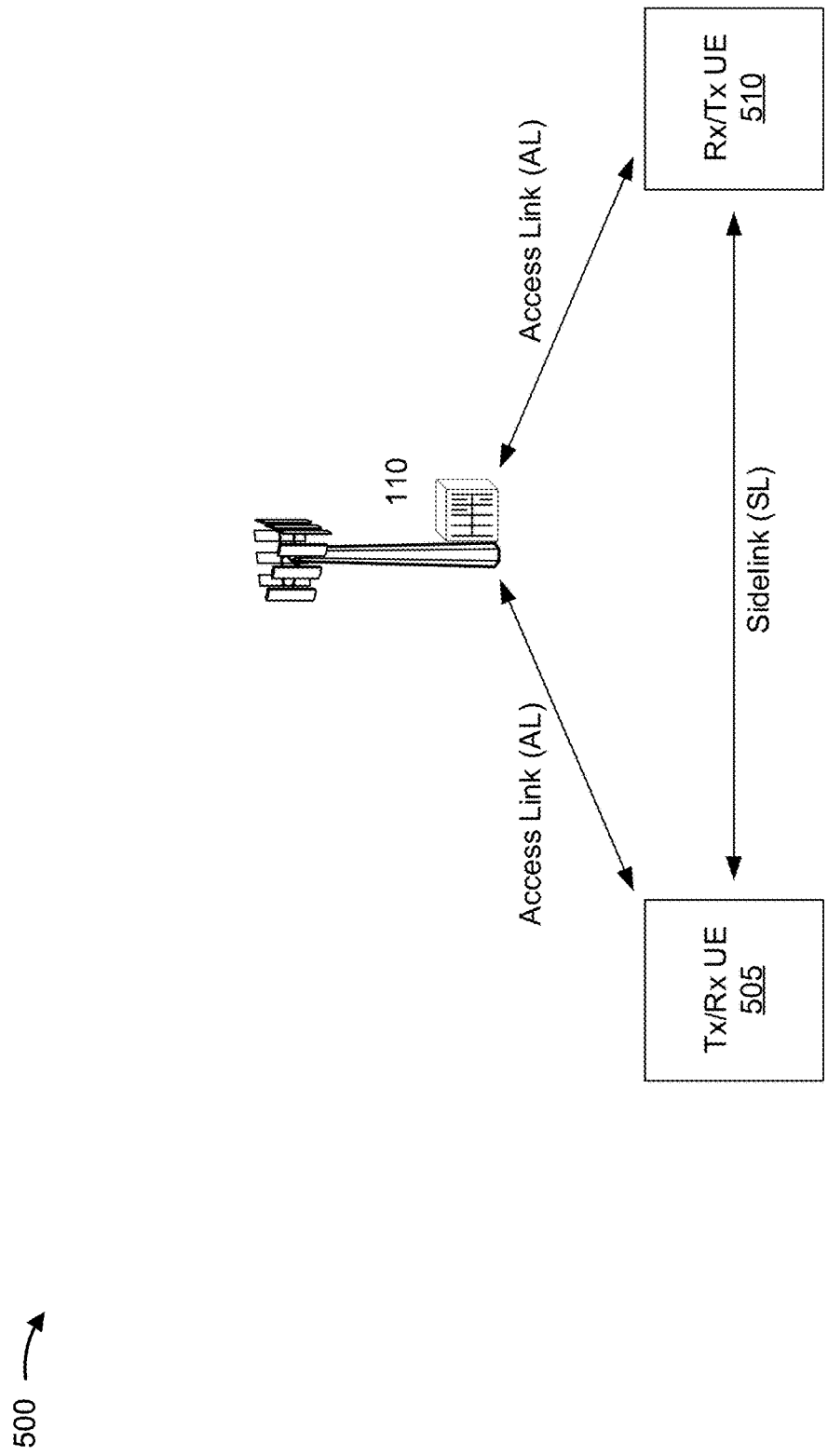
FIG. 5 is a diagram illustrating an example of sidelink communications and access link communications.

FIG. 5 is a diagram illustrating an example 500 of sidelink communications and access link communications. As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
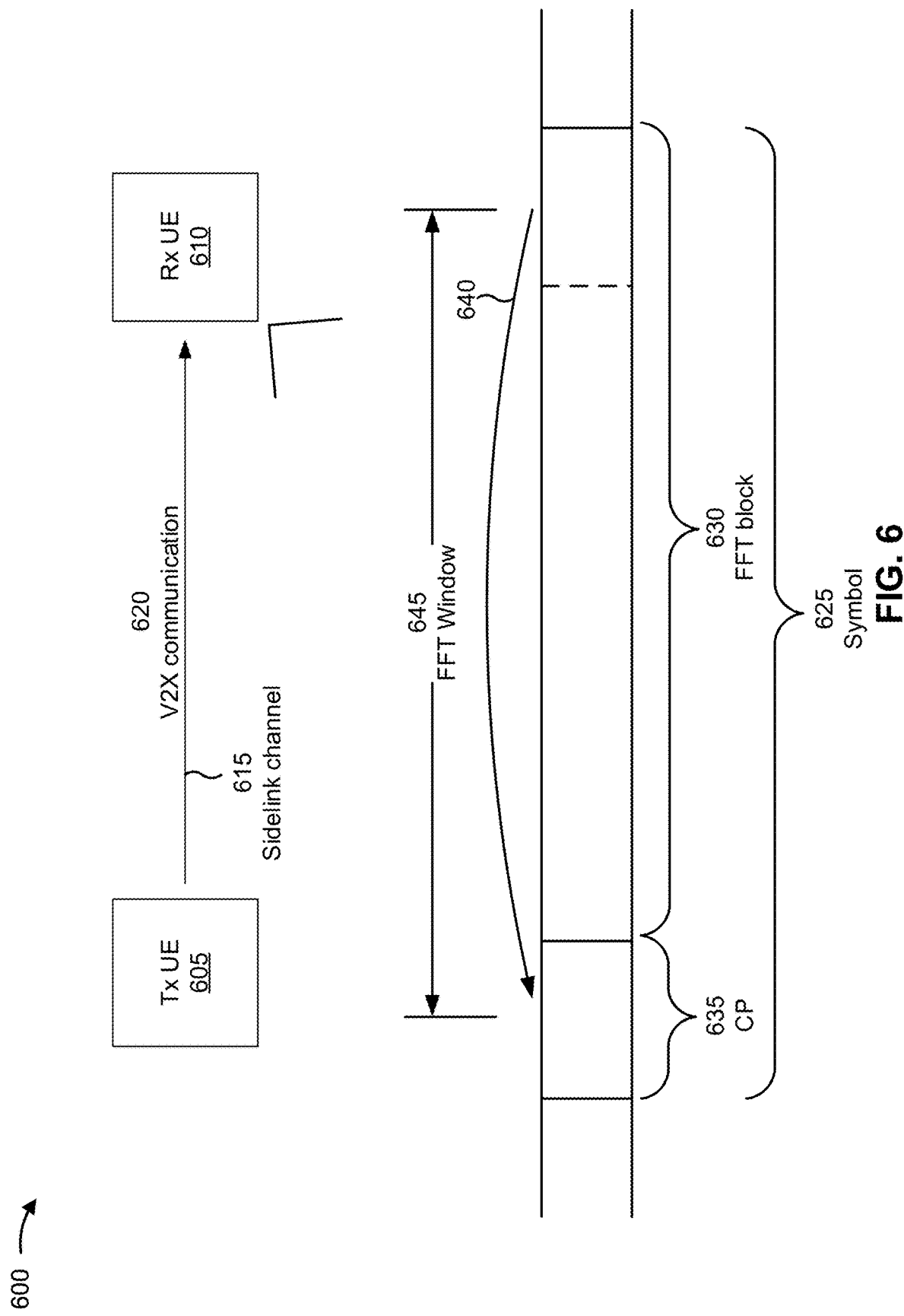
FIG. 6 is a diagram illustrating an example of a sidelink communication symbol structure.

FIG. 6 is a diagram illustrating an example 600 of a sidelink communication symbol structure. As shown in FIG. 6, a transmitter (Tx) UE 605 and a receiver (Rx) UE 610 may communicate using a sidelink channel 615 (e.g., in a similar manner to that described above). For example, as shown by reference number 620, the Tx UE 605 may transmit a V2X communication or signal to the Rx UE 610 using the sidelink channel 615.

As shown by reference number 625, an example symbol associated with the V2X communication is depicted. As shown by reference number 630, the symbol may include a fast Fourier transform (FFT) block. The FFT block may include data (e.g., data samples) associated with the communication or signal. The FFT block may also be referred to as a data block. As shown by reference number 635, the symbol may include a cyclic prefix (CP). As shown by reference number 640, the CP may be a copy of a portion of the FFT block of the symbol (e.g., shown by the dashed line in FIG. 6). For example, the CP of the symbol may be obtained by prepending a copy of the last N data samples from the end of the FFT block to the beginning of the FFT block. In this way, the symbol structure may result in a circular signal structure, such that the first N data samples and last N data samples of the symbol are identical. A CP may be used for a communication to avoid inter-symbol interference (ISI) between adjacent symbols in multipath channel environments. A transmitting device (e.g., the Tx UE 605) may transmit a symbol that may arrive at a receiving device (e.g., the Rx UE 610) with multiple replicas through different channel paths that have different propagation delays, and vice versa. If a duration of the CP is sufficiently large, there may be a window that contains a complete symbol from each replica so that ISI does not emerge within this window at the receiving device.

As shown by reference number 645, an FFT window may be used by the Rx UE 610 to obtain data samples for performing frequency domain processing (e.g., for performing an FFT operation, for performing demodulation, and/or for performing decoding) of the signal. For example, the Rx UE 610 may use the data samples within the FFT window for frequency domain processing of the signal. A timing of the FFT window may be determined to minimize ISI due to interfering signals arriving at the beginning of the symbol (e.g., during the CP) and/or due to interfering signals arriving at the end of the symbol (e.g., associated with a subsequent symbol). As the data included in the CP may be identical to the data at the end of the FFT block, the Rx UE 610 may obtain all of the data included in the FFT block using the FFT window (e.g., that includes data from the CP and data from the FFT block). For example, the data obtained during the FFT window may be cyclic shifted from the data included in the FFT block of the symbol. As a result, the Rx UE 610 may obtain all of the data samples of the symbol while also minimizing ISI by using the FFT window as shown. In V2X communication systems, a timing of the FFT window may be based at least in part on GNSS timing of the Rx UE 610.

As indicated above, FIG. 6 is provided as an example. Other examples may differ from what is described with respect to FIG. 6.

Figure 7:
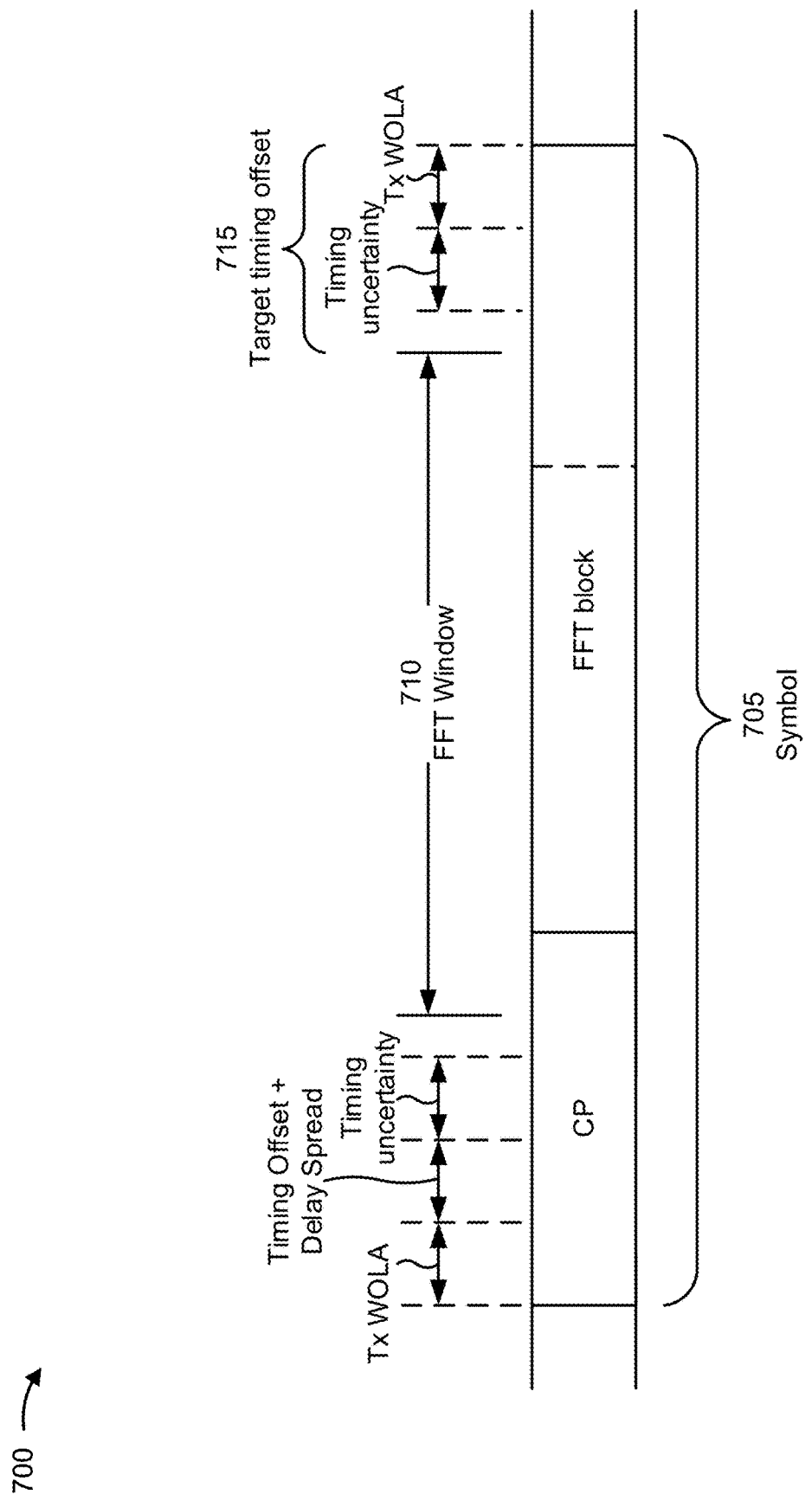
FIG. 7 is a diagram illustrating an example of a fast Fourier transform (FFT) window timing.

FIG. 7 is a diagram illustrating an example 700 of an FFT window timing. As shown in FIG. 7, the timing of an FFT window may be constrained by one or more limitations. The one or more limitations and/or values of the one or more limitations may be defined, or otherwise fixed, by a wireless communication standard, such as a 3GPP Specification.

As shown in FIG. 7, a symbol 705 may be associated with air FFT window 710 in a similar manner as described above in connection with FIG. 6. A timing of the FFT window may be constrained by one or more limitations, as shown in FIG. 7. For example, a portion of the beginning of the symbol 705 and a portion of the end of symbol 705 may be associated with a transmit weighted overlap and add (WOLA) procedure. The transmit WOLA procedure may be a windowing or filtering procedure used by a transmitting device to minimize in-band and out-of-band emissions. Data samples within the transmit WOLA window shown at the beginning of symbol 705 may be combined or mixed with data samples from the previous symbol. Similarly, data samples within the transmit WOLA window shown at the end of symbol 705 may be combined or mixed with data samples from the subsequent symbol. Therefore, the receiving device may be unable to use data samples within the transmit WOLA windows for frequency domain processing, as the data samples within the transmit WOLA windows may be combined or mixed with data samples from other symbols. As a result, the FFT window may not be placed within a transmit WOLA window. An amount of time associated with a transmit WOLA window may defined, or otherwise fixed, by a wireless communication standard as described above. A portion of the symbol 705 may be associated with a receive WOLA procedure in a similar manner as described above.

Additionally, a timing of the FFT window may be constrained by a timing uncertainty associated with the receiving device (e.g., associated with a GNSS timing of the receiving device). The timing uncertainty may identify, for example, a window of time during which the receiving device is expected to be at a position. In some aspects, the timing uncertainty may be defined by a confidence level associated with the movement of receiving device. For example, the timing uncertainty may be defined by a confidence level that indicates a level of confidence that the receiving device will be at a position at a point in time. Additionally or alternatively, the timing uncertainty may be defined by a confidence window associated with the movement. For example, the timing uncertainty may be defined by a confidence window that indicates a window of time in which the receiving device is expected to be at a position associated with the movement. Additionally, or alternatively, the timing uncertainty may be defined h a confidence distribution associated with the movement (e.g., a mean time to be at a position, with a Gaussian distribution around the mean with a variance of some amount of time). Therefore, as the timing of the FFT window at the receiving device may be based at least in part on GNSS timing of the receiving device, the timing uncertainty may provide a buffer or a window to account for the timing uncertainty of the receiving device to ensure that the FFT window does not occur during the transmit WOLA window.

As shown by reference number 715, a target timing offset from the end of the symbol 705 may be used to define or set a timing of the FFT window 710. The target timing offset may be used to account for a timing offset and/or a channel delay spread associated with a signal received by the receiver device. For example, due to a distance between the transmitting device and the receiving device, a timing offset may be introduced due to an amount of time required for the signal to travel from the transmitting device to the receiving device. The channel delay spread may be a measure of the multipath profile of a communication channel. Channel delay spread may be defined as the difference between the time of arrival of the earliest multipath component (e.g., the line-of-sight wave if there exists) of a signal and the time of arrival of the latest multipath component of the signal. In some implementations, the channel delay spread may be associated with a coherence bandwidth of the channel (e.g., the coherence bandwidth may be inversely proportional to the charnel delay spread).

In a V2X environment, an Rx UE may receive signals from multiple Tx UEs. The Tx UEs may be located at different locations and may be associated with different channel conditions. For example, the Rx UE may be required to receive signals, during a symbol, from different sources (e.g., different Tx UEs). Additionally, or alternatively, the signals may be associated with different channel delay spreads. Moreover, for V2X communications, a receiving UE may be required (e.g., based at least in part on a wireless communication standard) to support a timing offset corresponding to a distance of up to 1000 meters. However, due to the limitations described above (e.g., the transmit WOLA window and/or the timing uncertainty), a timing of the FFT window may be constrained and the Rx UE may have little flexibility in adjusting the timing of the FFT window to account for the different locations and different channel conditions of Tx UEs in the V2X environment.

In a traditional wireless communication environment (e.g., an UE or an NR wireless communication environment), a base station and the UE may communicate to coordinate the timing of the FFT window at the UE as the channel conditions and timing offset between the base station and the UE can be easily determined to optimize the timing of the FFT window. However, in a V2X environment, an Rx UE may need to account for multiple transmit locations and/or multiple channel delay spread values when determining a timing or location of the FFT window. As a result, in some cases, the FFT window determined by the Rx UE may be suboptimal for some Tx UEs communicating with the Rx UE. For example, if the Rx UE places the FFT window earlier in the symbol, signals from Tx UEs located far away from the Rx UE (e.g., associated with a large timing offset) may experience poor performance. Similarly, signals from Tx UEs associated with large channel delay spread values may experience poor performance.

Additionally, the Rx UE may be required (e.g., by a V2X wireless communication standard) to support a timing offset corresponding to a distance of up to 1000 meters (e.g., approximately 3.3 microseconds). Additionally, the Rx UE may be required to support a channel delay spread value for V2X channels which may be up to or exceeding 2.51 microseconds (e.g., for an extended vehicular A (EVA) model). Moreover, the timing uncertainty associated with the Rx HE may be up to or exceed 0.8 microseconds. Therefore, in combination with the other constraints on the FFT window timing or location described above, the Rx UE may be left with an insufficient amount of time to account for the required timing offsets and/or channel delay spreads described above. For example, the Rx UE, based at least in part on the constraints and symbol duration or cyclic prefix budget (e.g., defined, or otherwise fixed, by a wireless communication standard), may be left with only 0.5 microseconds to account for the timing offset and/or channel delay spread, which is insufficient to support a timing offset corresponding to a distance of up to 1000 meters and/or to support a channel delay spread value that may be experienced by V2X channels. As a result, the use of a single FFT window for V2X communications may result in poor performance for signals from some Tx UEs within the V2X environment.

Some techniques and apparatuses described herein enable optimized FFT windows for a V2X environment. For example, an Rx UE may be enabled to use multiple FFT windows (e.g., within a symbol) for receiving signals from different Tx UEs. In some implementations, a symbol boundary may be adjusted to allow for a maximum timing offset and/or channel delay spread for the V2X environment (e.g., with the constraints on the timing of the FFT window, as described above). An Rx UE may be enabled to select or optimize an FFT window on a per Tx UE or per resource allocation basis. That is, the Rx UE may estimate values for parameters (e.g., timing offset and/or channel delay spread) associated with a signal from a Tx UE. The Rx UE may determine an FFT window (e.g., from a set of FFT windows or a determined FFT window) based at least in part on the estimated values of the parameters associated with the signal from the Tx UE. The Rx UE may determine an FFT window for other Tx UEs in the V2X environment in a similar manner.

As a V2X environment may include multiple Tx UEs transmitting to the Rx UE at the same time using different frequencies, the Rx UE may receive and/or decode multiple signals from different Tx UEs during a same time period (e.g., during a same symbol or same subframe) using different FFT window configurations (e.g., different FFT window timings or locations) for the multiple signals. For example, the Rx UE may perform parallel frequency domain processing of the multiple signals using the determined or selected FFT window timing or location for each signal of the multiple signals. As a result, the Rx UE is enabled to achieve improved communication performance by using multiple FFT window timings or locations. Using multiple FFT window timings or locations results in improved communication performance and an increased coverage area for the Rx UE. For example, the Rx UE may experience improved communication performance for signals from Tx UEs that are located far away from the Rx UE (e.g., and associated with a large timing offset or propagation delay) and/or for signals from Tx UEs that are associated with a large channel delay spread. Moreover, the use of multiple FFT window timings or locations may enable the Rx UE to better comply with V2X environment communication requirements while also not sacrificing communication performance.

As indicated above, FIG. 7 is provided as an example. Other examples may differ from what is described with respect to FIG. 7.

Figure 8:
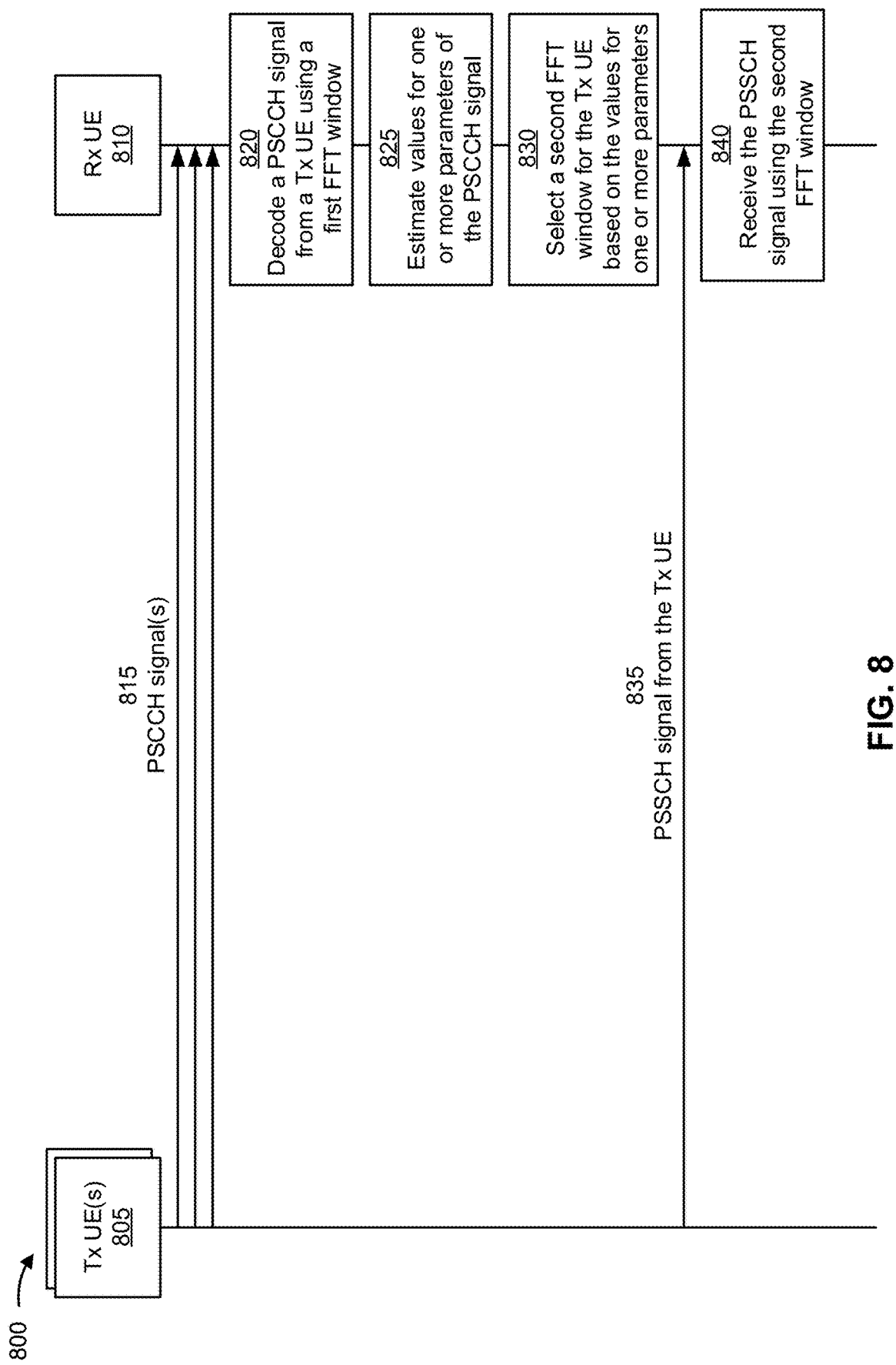
FIGS. 8 and 9 are diagrams illustrating examples associated with optimized FFT windows, in accordance with various aspects of the present disclosure.

FIG. 8 is a diagram illustrating an example 800 associated with optimized FFT windows, in accordance with various aspects of the present disclosure. As shown in FIG. 8, one or more Tx UEs 805 may communicate with an Rx UE 810. The one or more Tx UEs 805 may communicate with the Rx UE 810 using a sidelink channel, such as a PSCCH and/or a PSSCH. As used herein, "Tx UE" (or "transmitter UE") may refer to a UE that is transmitting a signal in the example 800 (e.g., and not a UE that only transmits signals). Similarly, "Rx UE" (or "receiver UE") may refer to a UE that is receiving a signal in the example 800 (e.g., and not a HE that only receives signals). For example, in some implementations, a Tx UE 805 may perform similar functions as described herein as being performed by the Rx UE 810 when the Tx UE 805 receives a signal.

As shown by reference number 815, the Rx UE 810 may receive one or more PSCCH signals. For example, a Tx UE 805 may transmit, to the Rx UE 810, a PSCCH signal carrying control information. In some implementations, the PSCCH signal may be associated with a PSSCH signal that is to be transmitted by the Tx UE 805. For example, in some implementations, the PSCCH signal may indicate or reserve a resource allocation for one or more upcoming PSSCH signals that are to be transmitted by the Tx UE 805.

As shown by reference number 820, the Rx UE 810 may decode the PSCCH signal from the Tx UE 805 using a first FFT window configuration (e.g., a first timing or a first location of an FFT window). In some implementations, the first FFT window configuration may be a default FFT window configuration. A default FFT window configuration may indicate an FFT window timing or FFT window location that is based at least in part on a default symbol boundary and/or constraints on the timing or location of an FFT window (e.g., may be similar to the single FFT window that is used as described above in connection with FIG. 6). In some implementations, the first FFT window configuration may be a predefined or configured FFT window configuration. For example, the first FFT window configuration may be an FFT window configuration that is to be used for PSCCH signals. As PSCCH signals may use a low modulation and coding scheme (MCS) and/or may be more robust to ISI (e.g., when compared to PSSCH signals), the Rx UE 810 may be enabled to use a single FFT window configuration for the PSCCH signals in order to optimize the FFT window configuration for PSSCH signals, as described in more detail below. For example, PSSCH signals may be more susceptible to ISI and/or packet loss than PSCCH signals. Therefore, the use of a suboptimal FFT window timing or location may have a larger impact (e.g., may result in signal loss or packet loss) on PSSCH signals than PSCCH signals.

In some implementations, the Rx UE 810 may be configured with and/or may receive an indication of a set of FFT window configurations. The first FFT window configuration may be included in the set of FFT window configurations. For example, an FFT window configuration (e.g., the first FFT window configuration) included in the set of FFT window configurations may be used for PSCCH signals (e.g., may be optimized to serve as many Tx UEs 805 as possible, as described above).

As shown by reference number 825, the Rx HE 810 may estimate values for one or more parameters of the PSCCH signal based at least in part on decoding the PSCCH signal as described above. The one or more parameters may include a timing offset parameter, a channel delay spread parameter, and/or an MCS parameter, among other examples. For example, the Rx UE 810 may use the PSCCH signal to perform one or more channel estimations to identify a timing offset, a channel delay spread, and/or an MCS estimated from the PSCCH signal (e.g., and the Tx UE 805).

As shown by reference number 830, the Rx UE 810 may select a second FFT window configuration for the Tx UE 805 that transmitted the PSCCH signal (and/or for a PSSCH signal associated with the PSCCH signal) based at least in part on the values for one or more parameters of the PSCCH signal. In some implementations, the Rx UE 810 may determine an FFT window configuration for the Tx UE 805 (and/or for a PSSCH signal associated with the PSCCH signal) based at least in part on the values for one or more parameters of the PSCCH signal. For example, the Rx UE 805 may determine a symbol boundary adjustment and/or a timing of an FFT window to be used for the Tx UE 805 (and/or for a PSSCH signal associated with the PSCCH signal) based at least in part on the values for one or more parameters of the PSCCH signal. For example, the Rx UE 810 may adjust a target timing offset for the FFT window to be used for the Tx UE 805 (and/or for a PSSCH signal associated with the PSCCH signal) and/or may adjust a symbol boundary to account for a timing offset and/or a channel delay spread estimated from the PSCCH signal.

In some implementations, the Tex UE 810 may select an FFT window configuration from the set of FFT window configurations (e.g., described above) for the Tx UE 805 (and/or for a PSSCH signal associated with the PSCCH signal) based at least in part on the values for one or more parameters of the PSCCH signal. For example, the Rx UE 810 may identify a best FFT window configuration from the set of FFT window configurations (e.g., based at least in part on the values for one or more parameters of the PSCCH signal) that is to be used for the Tx UE 805 and/or for a PSSCH signal associated with the PSCCH signal, in some implementations, the second FFT window configuration may be the same as the first FFT window configuration (e.g., if the values for one or more parameters of the PSCCH signal indicate that the first EFT window configuration should be used for the Tx UE 805 and/or for a PSSCH signal associated with the PSCCH signal).

As shown by reference number 835, the Tx UE 805 may transmit, to the Rx UE 810, a PSSCH signal. For example, the PSSCH signal may be associated with the PSCCH signal described above. In some implementations, the PSCCH signal may carry SCI or other information that schedules or reserves resources for the PSSCH signal.

As shown by reference number 840, the Rx UE 810 may receive and/or decode the PSSCH signal from the Tx UE using the second FFT window configuration. For example, the Rx UE 810 may use the second FFT window configuration, that was determined based at least in part on the values for one or more parameters of the PSCCH signal, to receive and/or decode the PSSCH signal. In this way, the Rx UE 805 may ensure that the ITT window timing or location (e.g., indicated by the second FFT window configuration) is optimal for the PSSCH signal (and/or for the Tx UE 805) as the Rx UE 810 was able to identify the estimated timing offset and/or channel delay spread of the PSCCH signal. Identifying the estimated timing offset and/or channel delay spread of the PSCCH signal allows the Rx UE 810 to determine and/or select an optimal FFT window timing or location for the Tx UE 805 and/or for the PSSCH signal. Using the optimal FFT window timing or location for the Tx UE 805 and/or for the PSSCH signal improves communication performance between the Tx UE 805 and the Rx UE 810.

The Rx UE 805 may determine and/or select optimal FFT window configurations for other Tx UEs 805 (e.g., in the one or more Tx UEs 805 described above) and/or based at least in part on other PSCCH signals received by the Rx UE 810 in a similar (or the same) manner as described above. For example, the Rx UE 810 may receive a second PSCCH signal from a second Tx UE 805 (e.g., that is different than the Tx UE 805 associated with the second FFT window configuration described above). The Rx UE 810 may receive and/or decode the second PSCCH signal using the first FFT window configuration (e.g., the default FFT window configuration). The Rx UE 810 may estimate values for the one or more parameters of the PSCCH signal based at least in part on decoding the PSCCH signal using the first FFT window configuration. The Rx UE 810 may determine or select a third FFT window configuration that is to be used for the second Tx UE 805 and/or for a second PSSCH signal associated with the second PSCCH signal. For example, the Rx UE 810 may determine an FFT window configuration (e.g., the third FFT window configuration) that is to be used for the second Tx UE 805 (and/or for the second PSSCH signal associated with the second PSCCH signal) based at least in part on the values for one or more parameters of the second PSCCH signal. In some implementations, the Rx UE 810 may select an FFT window configuration (e.g., the third FFT window configuration) from the set of FFT window configurations based at least in part on the values for one or more parameters of the second PSCCH signal. The Rx UE 810 may receive and/or decode signals (e.g., the second PSSCH signal) from the second Tx UE 805 using the third. FFT window configuration in a similar manner as described above.

As a V2X environment may include multiple Tx UEs 805 transmitting to the Rx UE 810 at the same time using different frequencies, the Rx UE 810 may receive and/or decode multiple signals from different Tx UEs 810 during a same time period (e.g., during a same symbol or same subframe) using different FFT window configurations for the multiple signals. For example, the Rx UE 810 may perform parallel frequency domain processing of the multiple signals using the determined or selected FFT window timing or location for each signal of the multiple signals. As a result, the Rx UE 810 is enabled to achieve better communication performance by using multiple FFT window timings or locations. Using multiple FFT window timings or locations results in improved communication performance and an increased coverage area for the Rx UE 810. For example, the Rx UE 810 may experience improved communication performance for signals from Tx UEs 805 that are located far away from the Rx UE 805 (e.g., and associated with a large timing offset or propagation delay) and/or for signals from Tx UEs 805 that are associated with a large channel delay spread.

As indicated above, FIG. 8 is provided as an example. Other examples may differ from what is described with respect to FIG. 8.

Figure 9:
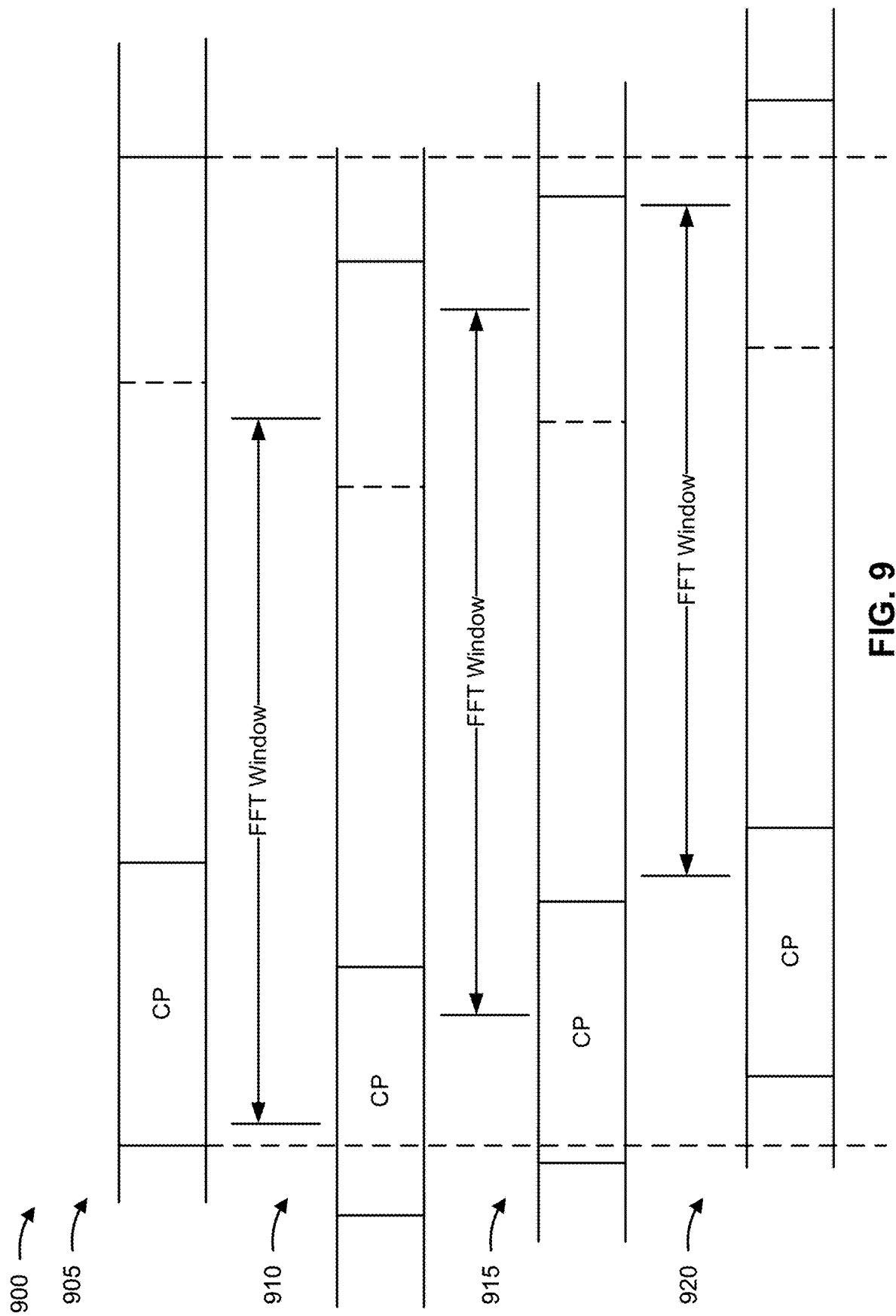

FIG. 9 is a diagram illustrating an example 900 associated with optimized FFT windows, in accordance with various aspects of the present disclosure. As shown in FIG. 9, an Rx UE (e.g., Rx UE 810 described above) may be configured with a set of FFT window configurations (e.g., shown by reference numbers 910, 915, and 920). For example, as shown in FIG. 9, the Rx UE may be configured with three FFT window configurations. Each FFT window configuration may be associated with a symbol boundary adjustment or shift (e.g., from the nominal or defined symbol boundary shown by reference number 905) and/or an FFT window timing or location. As described above, "Tx UE" (or "transmitter UE") may refer to a UE that is transmitting a signal in the example 900 (e.g., and not a UE that only transmits signals). Similarly, "Rx UE" (or "receiver UE") may refer to a UE that is receiving a signal in the example 900 (e.g., and not a UE that only receives signals). For example, in some implementations, a Tx UE may perform similar functions as described herein as being performed by the Rx UE when the Tx UE receives a signal.

As described above, the Rx UE may receive, from a Tx UE, a PSCCH signal. The Rx UE may decode the PSCCH signal using a default FFT window configuration (e.g., which may be the FFT window configuration 910, the FFT window configuration 915, or the FFT window configuration 920). The Rx UE may estimate values of one or more parameters (e.g., timing offset, channel delay spread, and/or MCS) of the PSCCH signal. The Rx UE may select an FFT window configuration from the FFT window configuration 910, the FFT window configuration 915, or the FFT window configuration 920 based at least in part on the values of the one or more parameters. For example, if the PSCCH signal is associated with a small timing offset (e.g., indicating that the Tx UE is located close to the Rx UE), then the Rx UE may select the FFT window configuration 910 associated with an FFT window that occurs earlier in the time domain. If the PSCCH signal is associated with a large timing offset (e.g., indicating that the Tx UE is located far from the Rx UE), then the Rx UE may select the EFT window configuration 920 associated with an FFT window that occurs later in the time domain. As described above, in some implementations, the Rx UE may determine an FFT window configuration (not shown in FIG. 9) to be used for the Tx UE and/or for a PSSCH signal associated with the PSCCH signal (e.g., rather than selecting the FFT window configuration from the set of FFT window configurations).

In some implementations, the Rx UE may receive multiple PSCCH signals from multiple Tx UEs. For example, a first Tx UE may be located closest to the Rx UE, a second Tx UE may be located further from the Rx UE than the first Tx UE, and a third Tx UE may be located furthest from the Rx UE. The Rx UE may receive and/or decode the multiple PSCCH signals to estimate values for the one or more parameters for each PSCCH signal. The Rx UE may select an FFT window configuration (e.g., from the FFT window configuration 910, the EFT window configuration 915, or the FFT window configuration 920) for each Tx UE based at least in part on the values for the one or more parameters for each PSCCH signal. For example, the Rx UE may select the FFT window configuration 910 for the first Tx UE, the FFT window configuration 915 for the second Tx UE, and the FFT window configuration 920 for the third Tx UE. The RA UE may receive PSSCH signals from the first Tx UE, the second Tx UE, and the third Tx UE (e.g., during a same symbol or subframe) using the corresponding FFT window configuration selected above. For example, the Rx UE may receive a first PSSCH signal transmitted by the first Tx UE using the FFT window configuration 910, a second PSSCH signal transmitted by the second Tx UE using the FFT window configuration 915, and a third PSSCH signal transmitted by the third Tx UE using the FFT window configuration 920. As a result, the Rx UE may be enabled to use multiple FFT windows to receive signals.

As indicated above, FIG. 9 is provided as an example. Other examples may differ from what is described with respect to FIG. 9.

Figure 10:
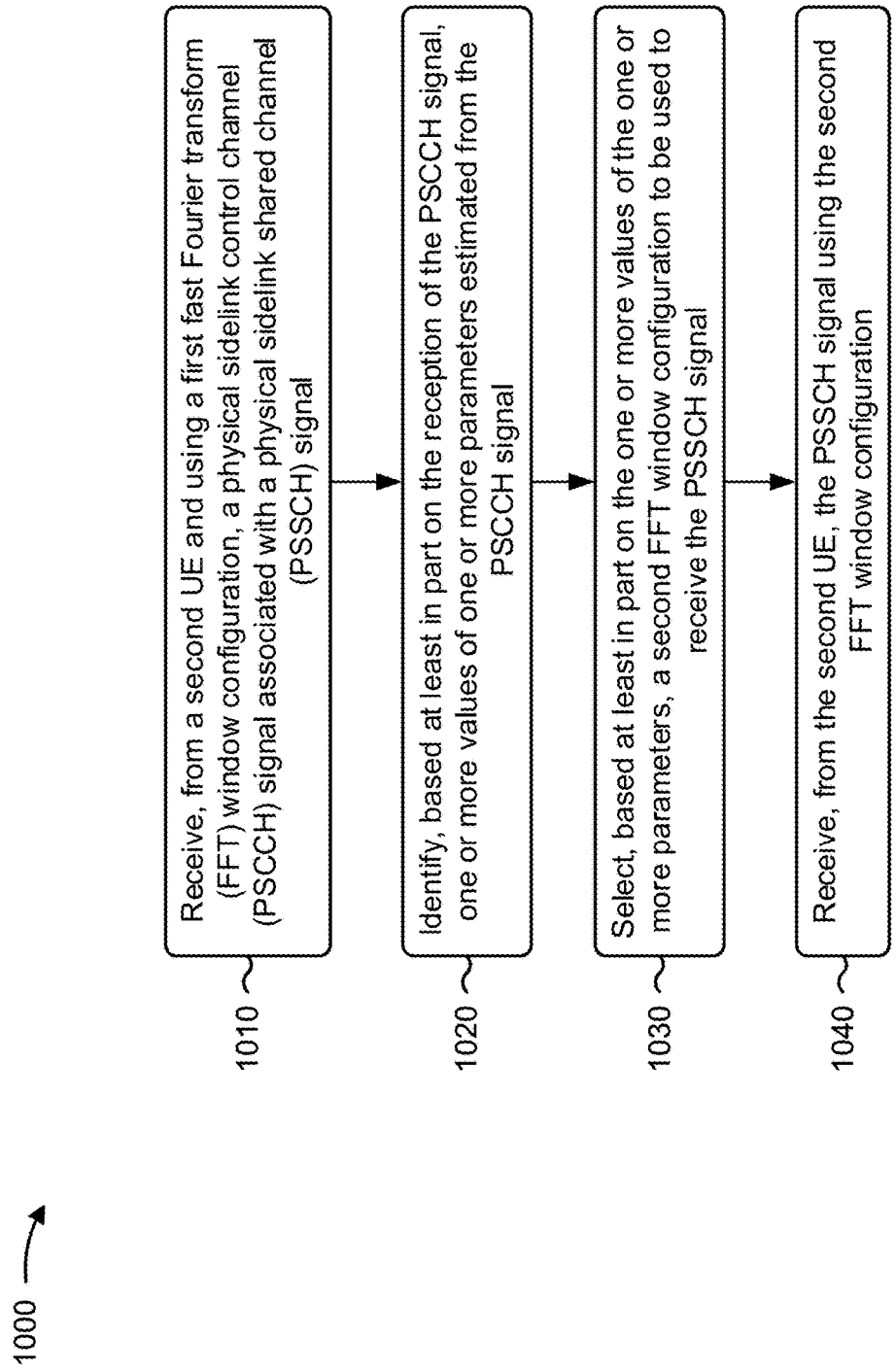
FIG. 10 is a diagram illustrating an example process associated with optimized FFT windows, in accordance with various aspects of the present disclosure.

FIG. 10 is a diagram illustrating an example process 1000 performed, for example, by a first UE, in accordance with various aspects of the present disclosure. Example process 1000 is an example where the UE 120 or Rx UE 810) performs operations associated with optimized FFT windows.

As shown it FIG. 10, it some aspects, process 1000 may include receiving, from a second UE and using a first FFT window configuration, a PSCCH signal associated with a PSSCH signal (block 1010). For example, the UE (e.g., using reception component 1102, depicted in FIG. 11) may receive, from a second UE and using a first FFT window configuration, a PSCCH signal associated with a PSSCH signal, as described above.

As further shown in FIG. 10, in some aspects, process 1000 may include identifying, based at least in part on the reception of the PSCCH signal, one or more values of one or more parameters estimated from the PSCCH signal (block 1020). For example, the UE (e.g., using channel estimation component 1108, depicted in FIG. 11) may identify, based at least in part on the reception of the PSCCH signal, one or more values of one or more parameters estimated from the PSCCH signal, as described above.

As further shower in FIG. 10, in some aspects, process 1000 may include selecting, based at least in part on the one or more values of the one or more parameters, a second FFT window configuration to be used to receive the PSSCH signal (block 1030). For example, the UE (e.g., using selection component 1110, depicted in FIG. 11) may select, based at least in part on the one or more values of the one or more parameters, a second FFT window configuration to be used to receive the PSSCH signal, as described above.

As further shower it FIG. 10, in some aspects, process 1000 may include receiving, from the second UE, the PSSCH signal using the second FFT window configuration (block 1040). For example, the UE (e.g., using reception component 1102, depicted in FIG. 11) may receive, from the second UE, the PSSCH signal using the second FFT window configuration, as described above.

Process 1000 may include additional aspects, such as any single aspect or any combination of aspects described below and/or in connection with one or more other processes described elsewhere herein.

In a first aspect, selecting the second FFT window configuration to be used to receive the PSSCH signal includes determining (e.g., using selection component 1110, depicted in FIG. 11) a timing of the second FFT window configuration based at least in part on the one or more values of the one or more parameters.

In a second aspect, process 1000 includes receiving a configuration indicating a set of FFT window configurations, where the set of FFT window configurations includes at least one of the first FFT window configuration or the second FFT window configuration.

In a third aspect, alone or in combination with the second aspect, selecting the second FFT window configuration to be used to receive the PSSCH signal includes selecting (e.g., using selection component 1110, depicted in FIG. 11), based at least in part on the one or more values of the one or more parameters, the second FFT window configuration from the set of FFT window configurations.

In a fourth aspect, alone or in combination with one or more of the first through third aspects, process 1000 includes receiving (e.g., using reception component 1102, depicted in FIG. 11), from a third UE, a second PSCCH signal associated with a second PSSCH signal, identifying (e.g., using channel estimation component 1108, depicted in FIG. 11), based at least in part on the reception of the second PSCCH one or more values of one or more parameters estimated from the second PSCCH signal, selecting (e.g., using selection component 1110, depicted in FIG. 11), based at least in part on the one or more values of the one or more parameters, a third FFT window configuration to be used to receive the second PSSCH signal, and receiving (e.g., using reception component 1102, depicted in FIG. 11), from the third UE, the second PSSCH signal using the third FFT window configuration.

In a fifth aspect, alone or in combination with the fourth aspect, receiving the second PSCCH signal includes receiving, using the first FFT window configuration, the second PSCCH signal associated with the second PSSCH signal.

In a sixth aspect, alone or in combination with one or more of the fourth through fifth aspects, receiving the second PSSCH signal using the third FFT window configuration includes receiving the PSSCH signal, using the second FFT window configuration, and the second PSSCH signal, using the third FFT window configuration, during a same time domain period.

In a seventh aspect, alone or in combination with one or more of the first through sixth aspects, the first FFT window configuration is a default FFT window configuration.

In an eighth aspect, alone or in combination with one or more of the first through seventh aspects, the one or more parameters include at least one of a timing offset parameter, a delay spread parameter, or a modulation and coding scheme parameter.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
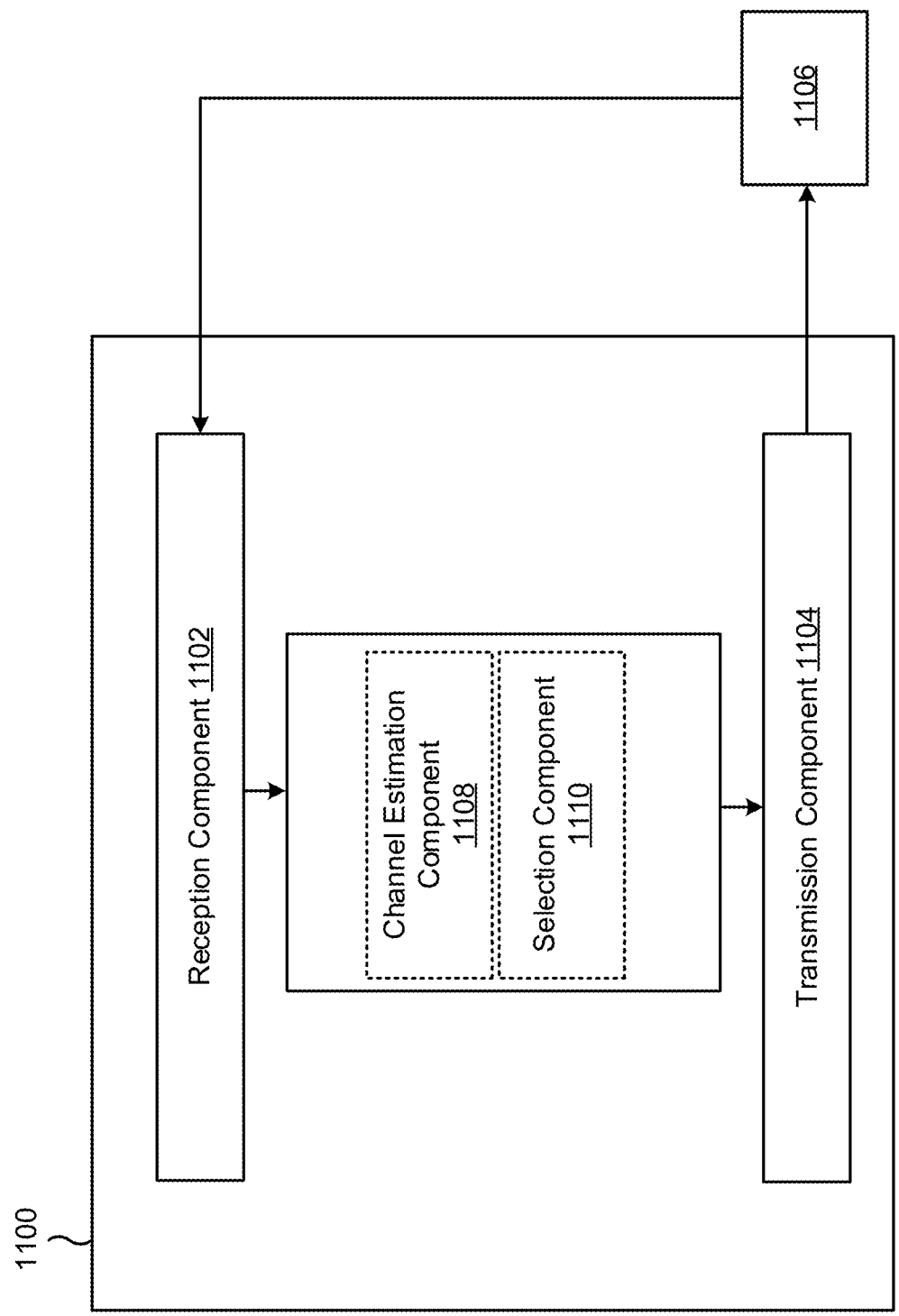
FIGS. 11 and 12 are block diagrams of example apparatuses for wireless communication, in accordance with various aspects of the present disclosure.

FIG. 11 is a block diagram of an example apparatus 1100 for wireless communication. The apparatus 1100 may be a UE (e.g., an Rx UE described herein), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a channel estimation component 1108 and/or a selection component 1110, among other examples.

In some aspects, the apparatus 1100 may be configured to perform one or more operations described herein in connection with FIGS. 8 and/or 9. Additionally, or alternatively, the apparatus 1100 may be configured to perform one or more processes described herein, such as process 1000 of FIG. 10, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or ore components described above in connection with FIG. 2. Additionally, or alternatively, one or more components of the set of components may be implemented at least in part as software stored in a memory. For example, a component (or a portion of a component) may be implemented as instructions or code stored in a nom-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive, from a second UE and using a first FFT window configuration, a PSCCH signal associated with a PSSCH signal. The channel estimation component 1108 may identify, based at least in part on the reception of the PSCCH signal, one or more values of one or more parameters estimated from the PSCCH signal. The selection component 1110 may select, based at least in part on the one or more values of the one or more parameters, a second FFT window configuration to be used to receive the PSSCH signal. The reception component 1102 may receive, from the second UE, the PSSCH signal using the second FFT window configuration.

The selection component 1110 may determine a timing of the second FFT window configuration based at least in part on the one or more values of the one or more parameters.

The reception component 1102 may receive a configuration indicating a set of FFT window configurations, wherein the set of FFT window configurations includes at least one of the first FFT window configuration or the second FFT window configuration.

The selection component 1110 may select, based at least in part on the one or more values of the one or more parameters, the second FFT window configuration from the set of FFT window configurations.

The reception component 1102 may receive, from a third UE, a second PSCCH signal associated with a second PSSCH signal. The channel estimation component 1108 may identify, based at least in part on the reception of the second PSCCH signal, one or more values of one or more parameters estimated from the second PSCCH signal. The selection component 1110 may select, based at least in part on the one or more values of the one or more parameters, a third FFT window configuration to be used to receive the second PSSCH signal. The reception component 1102 may receive, from the third UE, the second PSSCH signal using the third FFT window configuration.

The reception component 1102 may receive, using the first FFT window configuration, the second PSCCH signal associated with the second PSSCH signal. The reception component 1102 may receive the PSSCH signal, using the second FFT window configuration, and the second PSSCH signal, using the third FFT window configuration, during a same time domain period.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
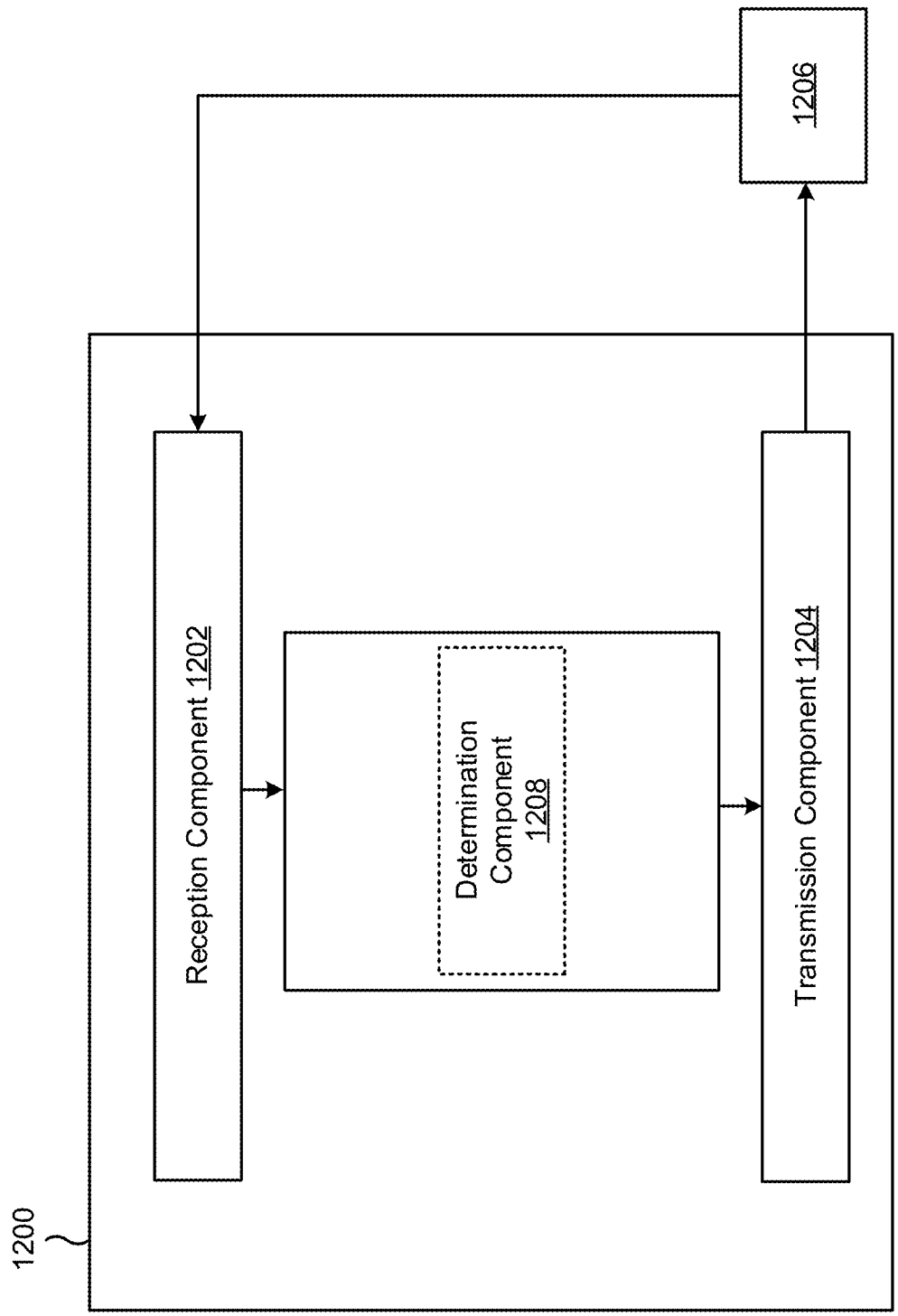

FIG. 12 is a block diagram of an example apparatus 1200 for wireless communication. The apparatus 1200 may be a UE (e.g., a Tx UE described herein), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 8 and/or 9. Additionally, or alternatively, the apparatus 1200 may be configured to perform one or more processes described herein or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The transmission component 1204, may transmit, to a second UE, a PSCCH signal. The determination component 1208 may determine one or more transmit parameters for the PSCCH signal, such as a transmit power and/or an MCS, among other examples. The transmission component 1204 may transmit, to the second UE, a PSSCH signal that is to be received by the second UE using an FFT window configuration that is selected, by the second UE, based at least in part on estimated parameters of the PSCCH signal.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some aspects of the present disclosure:

Aspect 1: A method of wireless communication performed by a first user equipment (UE), comprising: receiving, from a second UE and using a first fast Fourier transform (FFT) window configuration, a physical sidelink control channel (PSCCH) signal associated with a physical sidelink shared channel (PSSCH) signal; identifying, based at least in part on the reception of the PSCCH signal, one or more values of one or more parameters estimated from the PSCCH signal; selecting, based at least in part on the one or more values of the one or more parameters, a second FFT window configuration to be used to receive the PSSCH signal; and receiving, from the second UE, the PSSCH signal using the second FFT window configuration.

Aspect 2: The method of aspect 1, wherein selecting the second FFT window configuration to be used to receive the PSSCH signal comprises: determining a timing of the second FFT window configuration based at least in part on the one or more values of the one or more parameters.

Aspect 3: The method of aspect 1, further comprising: receiving a configuration indicating a set of FFT window configurations, wherein the set of FFT window configurations includes at least one of the first FFT window configuration or the second EFT window configuration.

Aspect 4: The method of aspect 3, wherein selecting the second FFT window configuration to be used to receive the PSSCH signal comprises: selecting, based at least in part on the one or more values of the one or more parameters, the second FFT window configuration from the set of FFT window configurations.

Aspect 5: The method of any of aspects 1-4, further comprising: receiving, from a third UE, a second PSCCH signal associated with a second PSSCH signal; identifying, based at least in part on the reception of the second PSCCH signal, one or more values of one or more parameters estimated from the second PSCCH signal; selecting, based at least in part on the one or more values of the one or more parameters, a third FFT window configuration to be used to receive the second PSSCH signal; and receiving, from the third UE, the second PSSCH signal using the third FFT window configuration.

Aspect 6: The method of aspect 5, wherein receiving the second PSCCH signal comprises: receiving, using the first FFT window configuration, the second PSCCH signal associated with the second PSSCH signal.

Aspect 7: The method of any of aspects 5-6, wherein receiving the second PSSCH signal using the third FFT window configuration comprises: receiving the PSCCH signal, using the second FFT window configuration, and the second PSSCH signal, using the third FFT window configuration, during a same time domain period.

Aspect 8: The method of any of aspects 1-7, wherein the first FFT window configuration is a default FFT window configuration.

Aspect 9: The method of any of aspects 1-8, wherein the one or more parameters include at least one of: a timing offset parameter, a delay spread parameter, or a modulation and coding scheme parameter.

Aspect 10: An apparatus for wireless communication at a device, comprising a processor; memory coupled with the processor; and instructions stored in the memory and executable by the processor to cause the apparatus to perform the method of one or more aspects of aspects 1-9.

Aspect 11: A device for wireless communication, comprising a memory and one or more processors coupled to the memory, the memory and the one or more processors configured to perform the method of one or more aspects of aspects 1-9.

Aspect 12: An apparatus for wireless communication, comprising at least one means for performing the method of one or more aspects of aspects 1-9.

Aspect 13: A non-transitory computer-readable medium storing code for wireless communication, the code comprising instructions executable by a processor to perform the method of one or more aspects of aspects 1-9.

Aspect 14: A non-transitory computer-readable medium storing a set of instructions for wireless communication, the set of instructions comprising one or more instructions that, when executed by one or more processors of a device, cause the device to perform the method of one or more aspects of aspects 1-9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving, from a second UE and using a first fast Fourier transform (FFT) window configuration, a physical sidelink control channel (PSCCH) signal associated with a physical sidelink shared channel (PSSCH) signal, the first FFT window configuration associated with at least one of a first symbol boundary adjustment, a first symbol boundary shift, a first FFT window timing, or a first FFT window location;
   identifying, based at least in part on the reception of the PSCCH signal, one or more values of one or more parameters estimated from the PSCCH signal;
   selecting, based at least in part on the one or more values of the one or more parameters, a second FFT window configuration to be used to receive the PSSCH signal, the second FFT window configuration associated with at least one of a second symbol boundary adjustment, a second symbol boundary shift, a second FFT window timing, or a second FFT window location; and
   receiving, from the second UE, the PSSCH signal using the second FFT window configuration.

2. The method of claim 1, wherein the selection of the second FFT window configuration to be used to receive the PSSCH signal comprises:
   determining a timing of the second FFT window configuration based at least in part on the one or more values of the one or more parameters.

3. The method of claim 1, further comprising:
   receiving a configuration indicating a set of FFT window configurations, wherein the set of FFT window configurations includes at least one of the first FFT window configuration or the second FFT window configuration.

4. The method of claim 3, wherein the selection of the second FFT window configuration to be used to receive the PSSCH signal comprises:
   selecting, based at least in part on the one or more values of the one or more parameters, the second FFT window configuration from the set of FFT window configurations.

5. The method of claim 1, further comprising:
   receiving, from a third UE, a second PSCCH signal associated with a second PSSCH signal;
   identifying, based at least in part on the reception of the second PSCCH signal, one or more values of one or more parameters estimated from the second PSCCH signal;
   selecting, based at least in part on the one or more values of the one or more parameters, a third FFT window configuration to be used to receive the second PSSCH signal; and
   receiving, from the third UE, the second PSSCH signal using the third FFT window configuration.

6. The method of claim 5, wherein the reception of the second PSCCH signal comprises:
   receiving, using the first FFT window configuration, the second PSCCH signal associated with the second PSSCH signal.

7. The method of claim 5, wherein the reception of the second PSSCH signal using the third FFT window configuration comprises:
   receiving the PSSCH signal, using the second FFT window configuration, and the second PSSCH signal, using the third FFT window configuration, during a same time domain period.

8. The method of claim 1, wherein the first FFT window configuration is a default FFT window configuration.

9. The method of claim 1, wherein the one or more parameters include at least one of:
   a timing offset parameter,
   a delay spread parameter, or
   a modulation and coding scheme parameter.

10. A first user equipment (UE) for wireless communication, comprising:
    a memory; and
    one or more processors coupled to the memory, the one or more processors configured to:
      receive, from a second UE and using a first fast Fourier transform (FFT) window configuration, a physical sidelink control channel (PSCCH) signal associated with a physical sidelink shared channel (PSSCH) signal, the first FFT window configuration associated with at least one of a first symbol boundary adjustment, a first symbol boundary shift, a first FFT window timing, or a first FFT window location;
      identify, based at least in part on the reception of the PSCCH signal, one or more values of one or more parameters estimated from the PSCCH signal;
      select, based at least in part on the one or more values of the one or more parameters, a second FFT window configuration to be used to receive the PSSCH signal the second FFT window configuration associated with at least one of a second symbol boundary adjustment, a second symbol boundary shift, a second FFT window timing, or a second FFT window location; and
      receive, from the second UE, the PSSCH signal using the second FFT window configuration.

11. The first UE of claim 10, wherein the one or more processors, when selecting the second FFT window configuration to be used to receive the PSSCH signal, are configured to:
determine a timing of the second FFT window configuration based at least in part on the one or more values of the one or more parameters.

12. The first UE of claim 10, wherein the one or more processors are further configured to:
receive a configuration indicating a set of FFT window configurations, wherein the set of FFT window configurations includes at least one of the first FFT window configuration or the second FFT window configuration.

13. The first UE of claim 12, wherein the one or more processors, when selecting the second FFT window configuration to be used to receive the PSSCH signal, are configured to:
select, based at least in part on the one or more values of the one or more parameters, the second FFT window configuration from the set of FFT window configurations.

14. The first UE of claim 10, wherein the one or more processors are further configured to:
receive, from a third UE, a second PSCCH signal associated with a second PSSCH signal;
identify, based at least in part on the reception of the second PSCCH signal, one or more values of one or more parameters estimated from the second PSCCH signal;
select, based at least in part on the one or more values of the one or more parameters, a third FFT window configuration to be used to receive the second PSSCH signal; and
receive, from the third UE, the second PSSCH signal using the third FFT window configuration.

15. The first UE of claim 14, wherein the one or more processors, when receiving the second PSCCH signal, are configured to:
receive, using the first FFT window configuration, the second PSCCH signal associated with the second PSSCH signal.

16. The first UE of claim 14, wherein the one or more processors, when receiving the second PSSCH signal using the third FFT window configuration, are configured to:
receive the PSSCH signal, using the second FFT window configuration, and the second PSSCH signal, using the third FFT window configuration, during a same time domain period.

17. The first UE of claim 10, wherein the first FFT window configuration is a default FFT window configuration.

18. The first UE of claim 10, wherein the one or more parameters include at least one of:
a timing offset parameter,
a delay spread parameter, or
a modulation and coding scheme parameter.

19. A non-transitory computer-readable medium storing a set of instructions for wireless communication, the set of instructions comprising:
one or more instructions that, when executed by one or more processors of a first user equipment (UE), cause the first UE to:
receive, from a second UE and using a first fast Fourier transform (FFT) window configuration, a physical sidelink control channel (PSCCH) signal associated with a physical sidelink shared channel (PSSCH) signal, the first FFT window configuration associated with at least one of a first symbol boundary adjustment, a first symbol boundary shift, a first FFT window timing, or a first FFT window location;
identify, based at least in part on the reception of the PSCCH signal, one or more values of one or more parameters estimated from the PSCCH signal;
select, based at least in part on the one or more values of the one or more parameters, a second FFT window configuration to be used to receive the PSSCH signal, the second FFT window configuration associated with at least one of a second symbol boundary adjustment, a second symbol boundary shift, a second FFT window timing, or a second FFT window location; and
receive, from the second UE, the PSSCH signal using the second FFT window configuration.

20. The non-transitory computer-readable medium of claim 19, wherein the one or more instructions, that cause the first UE to select the second FFT window configuration to be used to receive the PSSCH signal, cause the first UE to:
determine a timing of the second FFT window configuration based at least in part on the one or more values of the one or more parameters.

21. The non-transitory computer-readable medium of claim 19, wherein the one or more instructions further cause the first UE to:
receive a configuration indicating a set of FFT window configurations, wherein the set of FFT window configurations includes at least one of the first FFT window configuration or the second FFT window configuration.

22. The non-transitory computer-readable medium of claim 21, wherein the one or more instructions, that cause the first UE to select the second FFT window configuration to be used to receive the PSSCH signal, cause the first UE to:
select, based at least in part on the one or more values of the one or more parameters, the second FFT window configuration from the set of FFT window configurations.

23. The non-transitory computer-readable medium of claim 19, wherein the one or more instructions further cause the first UE to:
receive, from a third UE, a second PSCCH signal associated with a second PSSCH signal;
identify, based at least in part on the reception of the second PSCCH signal, one or more values of one or more parameters estimated from the second PSCCH signal;
select, based at least in part on the one or more values of the one or more parameters, a third FFT window configuration to be used to receive the second PSSCH signal; and
receive, from the third UE, the second PSSCH signal using the third FFT window configuration.

24. The non-transitory computer-readable medium of claim 23, wherein the one or more instructions, that cause the first UE to receive the second PSSCH signal using the third FFT window configuration, cause the first UE to:
receive the PSSCH signal, using the second FFT window configuration, and the second PSSCH signal, using the third FFT window configuration, during a same time domain period.

25. An apparatus for wireless communication, comprising:
means for receiving, from a first user equipment (UE) and using a first fast Fourier transform (FFT) window configuration, a physical sidelink control channel (PSCCH) signal associated with a physical sidelink shared channel (PSSCH) signal, the first FFT window configuration associated with at least one of a first symbol boundary adjustment, a first symbol boundary shift, a first FFT window timing, or a first FFT window location;

means for identifying, based at least in part on the reception of the PSCCH signal, one or more values of one or more parameters estimated from the PSCCH signal;

means for selecting, based at least in part on the one or more values of the one or more parameters, a second FFT window configuration to be used to receive the PSSCH signal, the second FFT window configuration associated with at least one of a second symbol boundary adjustment, a second symbol boundary shift, a second FFT window timing, or a second FFT window location; and means for receiving, from the first UE, the PSSCH signal using the second FFT window configuration.

26. The apparatus of claim 25, wherein the means for selecting the second FFT window configuration to be used to receive the PSSCH signal comprises:

means for determining a timing of the second FFT window configuration based at least in part on the one or more values of the one or more parameters.

27. The apparatus of claim 25, further comprising:

means for receiving a configuration indicating a set of FFT window configurations, wherein the set of FFT window configurations includes at least one of the first FFT window configuration or the second FFT window configuration.

28. The apparatus of claim 27, wherein the means for selecting the second FFT window configuration to be used to receive the PSSCH signal comprises:

means for selecting, based at least in part on the one or more values of the one or more parameters, the second FFT window configuration from the set of FFT window configurations.

29. The apparatus of claim 25, further comprising:

means for receiving, from a second UE, a second PSCCH signal associated with a second PSSCH signal;

means for identifying, based at least in part on the reception of the second PSCCH signal, one or more values of one or more parameters estimated from the second PSCCH signal;

means for selecting, based at least in part on the one or more values of the one or more parameters, a third FFT window configuration to be used to receive the second PSSCH signal; and means for receiving, from the second UE, the second PSSCH signal using the third FFT window configuration.

30. The apparatus of claim 29, wherein the means for receiving the second PSSCH signal using the third FFT window configuration comprises:

means for receiving the PSSCH signal, using the second FFT window configuration, and the second PSSCH signal, using the third FFT window configuration, during a same time domain period.

* * * * *